United States Patent [19]
Glendon

[11] Patent Number: 5,931,503
[45] Date of Patent: Aug. 3, 1999

[54] SEAT BELT SHOULDER STRAP ADJUSTMENT DEVICE

[76] Inventor: Julia E. Glendon, 14 Elm St., Acton, Mass. 01720

[21] Appl. No.: 08/890,922

[22] Filed: Jul. 10, 1997

Related U.S. Application Data

[60] Provisional application No. 60/021,921, Jul. 17, 1996.

[51] Int. Cl.$^6$ .................................................. B60R 22/00
[52] U.S. Cl. ............................................ 280/808; 297/483
[58] Field of Search ............................... 280/808, 801.1; 297/483, 482, 468, 466

[56] References Cited

U.S. PATENT DOCUMENTS

| | | | |
|---|---|---|---|
| 1,712,198 | 5/1929 | Clapp | 297/473 |
| 4,179,086 | 12/1979 | Yamada | 244/122 AG |
| 4,588,224 | 5/1986 | Hill, Jr. . | |
| 4,609,205 | 9/1986 | McKeever | 280/808 |
| 4,697,849 | 10/1987 | Smith | 297/485 |
| 4,832,367 | 5/1989 | Lisenby | 280/808 |
| 4,898,185 | 2/1990 | Fuller . | |
| 4,938,535 | 7/1990 | Condon et al. | 297/483 |
| 4,946,198 | 8/1990 | Pittore et al. | 280/808 |
| 4,951,965 | 8/1990 | Brown | 280/801.1 |
| 5,042,838 | 8/1991 | Carter | 280/808 |
| 5,135,257 | 8/1992 | Short | 280/808 |
| 5,141,287 | 8/1992 | Grene | 297/483 |
| 5,178,439 | 1/1993 | McCracken | 297/483 |
| 5,215,333 | 6/1993 | Knight | 280/801.1 |
| 5,421,614 | 6/1995 | Zheng | 280/801.1 |
| 5,468,020 | 11/1995 | Scime | 280/808 |
| 5,482,324 | 1/1996 | Gardiner et al. | 280/801.1 |
| 5,522,404 | 6/1996 | Williams | 128/876 |

OTHER PUBLICATIONS

"Add–ons Make Safety Belts More Comfortable," *Consumer Reports*, Apr. 1994, p. 217.
Sullivan et al., "Evaluation of Devices to Improve Shoulder Belt Fit," DOT F 1700.7, Report No. DOT HS 808 383, Aug. 1994, 4 pages.
Copy of PCT Search Report Mailed Sep. 3, 1997, PCT/US97/12259 filed Jul. 10, 1997.
Written opinion issued for International Application No. PCT/US97/12259 (dated Jul. 27, 1998).

*Primary Examiner*—Peter C. English
*Attorney, Agent, or Firm*—Fish & Richardson P.C.

[57] ABSTRACT

An adjustment device, e.g., for use by children and small adults, retains the shoulder strap of a vehicle seat belt in a position comfortably away from the user's neck and face. The adjustment device comprises a body attachment device which is adjustably positioned about the user's body, especially a user's shoulder, and a releasable securement device which secures the seat belt shoulder strap to the body attachment device, drawing it away from the neck and face region of the user.

19 Claims, 3 Drawing Sheets

SEAT BELT SHOULDER STRAP ADJUSTMENT DEVICE

This application claims the benefit of U.S. Provisional Application No. 60/021,921, filed Jul. 17, 1996.

FIELD OF THE INVENTION

The invention relates to devices for adjusting the position of the shoulder strap of a vehicle seat belt.

BACKGROUND OF THE INVENTION

Most vehicle seat belts, e.g., for automobiles and trucks, are proportioned for use by a normal size or larger adult, with the shoulder strap positioned accordingly. Automobile safety research indicates that there is a gap in protecting school-age children who are too big for toddler car seats and too small for optimum use of adult lap-shoulder belts. When a child or small adult uses the lap-shoulder belt, the shoulder strap presses uncomfortably into user's neck, or, for smaller children, extends across the user's face. Even average size or larger adults sometimes find the shoulder strap uncomfortable. As a result, many children, and even smaller or other adults, neglect to use the seat belt, ride with the shoulder strap clamped between their body and the seat, or otherwise obstruct or entirely defeat the safety objectives of the seat belt.

SUMMARY OF THE INVENTION

The invention fills the gap in seat belt protection described above, by providing a seat belt shoulder strap adjustment device for use by children and small adults. This adjustment device retains the shoulder strap of a vehicle seat belt in a position comfortably away from the user's neck and face, while still meeting the safety objectives of the seat belt.

The adjustment device includes a body attachment device which is adjustably positioned about a user's body, especially a user's shoulder, and a releasable securement device which secures the seat belt shoulder strap to the body attachment device, drawing the shoulder strap away from the user's face and neck region. The body attachment device and the releasable securement device are both adjustable for comfort and fit.

Other features and advantages of the invention will be apparent from the following description of a presently preferred embodiment, and from the claims.

DESCRIPTION OF THE PREFERRED EMBODIMENTS

Figure 1:
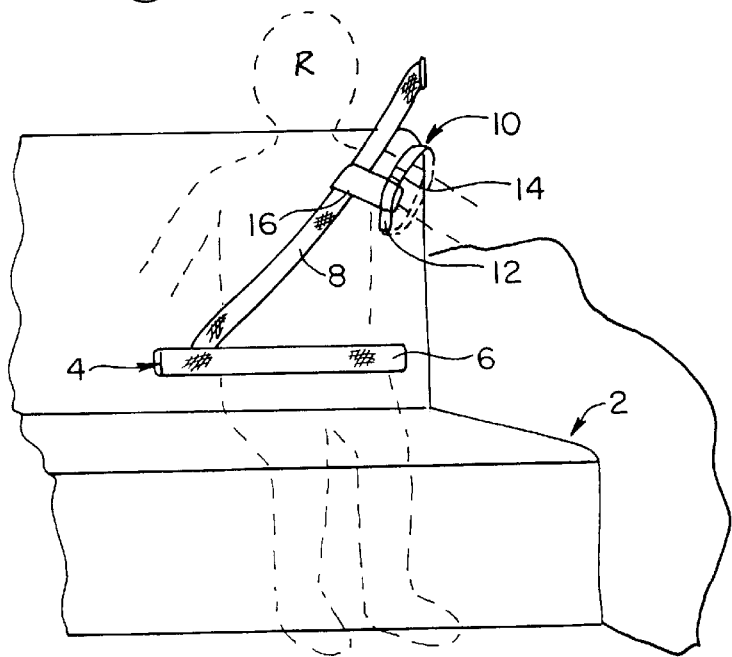
FIG. 1 is a somewhat diagrammatic view of a child or small adult in a vehicle with a passenger safety restraint system and a seat belt shoulder strap adjustment device of the invention.

Referring to FIG. 1, a vehicle 2 is equipped with a passenger safety restraint system 4 consisting of a seat belt 6 with a shoulder strap 8.

An adjustment device 10 includes an adjustment strap 12, e.g., of woven fiber or other suitable strong material, sized to be releasably fastened, e.g., with a hook-and-loop type fastener 14, or with a buckle or other fastening element, about the user's body, especially the user's shoulder in the region of the upper arm. The length of the strap can be adjusted, e.g., to accommodate the individual user. The seat belt shoulder strap 8 is releasably engaged in clip 16, or other releasable securement device, positioned along the front portion of the adjustment strap 12 to position the shoulder strap 8 comfortably away from the user's neck and face region, R.

Figure 2:
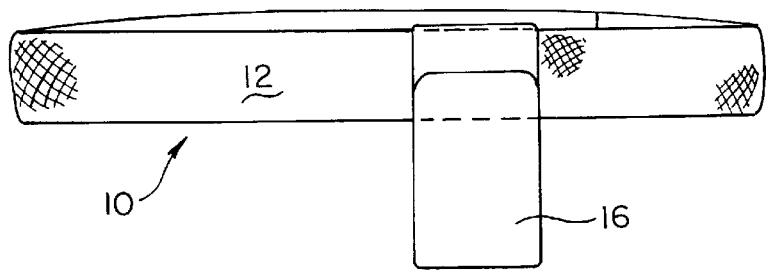
FIG. 2 is a top plan view of the seat belt shoulder strap adjustment device of FIG. 1.
Figure 3:
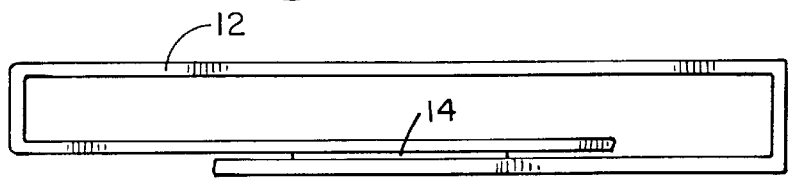
FIG. 3 is a side view of the adjustment strap of the seat belt shoulder strap adjustment device of FIG. 1.
Figure 4:
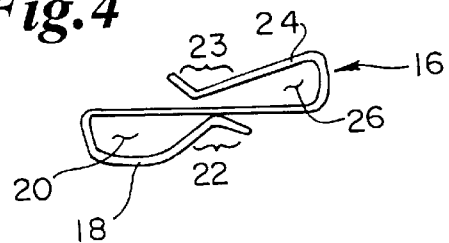
FIG. 4 is a side view of the securement clip of the seat belt shoulder strap adjustment device of FIG. 1.

Referring to FIGS. 2, 3, and 4, in one preferred embodiment, the clip 16 (shown in FIGS. 2 and 4) is formed, e.g., of plastic, spring metal, or other suitable material. The clip is about 1½ inches wide and 3 inches long, and has a first arm 18 defining a first region 20 for receiving the shoulder strap 8, the first arm 18 having a tip region 22 which resiliently impinges upon the material of the shoulder strap to resiliently secure the clip relative to the shoulder strap. The clip 16 also has a second arm 24 defining a second region 26 for receiving the adjustment strap 12, the second arm 24 having a tip region 28 which resiliently impinges upon the material of the adjustment strap to hold the clip in place relative to the adjustment strap. The position of the clip is adjustable along both the shoulder strap 8 and the adjustment strap 12.

The adjustment strap 12 (shown in FIGS. 2 and 3) is about 1 inch wide by 24 inches long and formed of woven nylon. The cooperating elements of hook-and loop type fastener 14, secured within about 1 inch from the opposite ends of strap 12, are each about ¾ inch wide by 3¼ inches long. The adjustment strap has a diameter of about 6 inches when the opposed fastener elements are fully overlapped; however, as noted above, the degree of overlap can be varied for adjustment of the diameter to accommodate the particular user.

Figure 5:
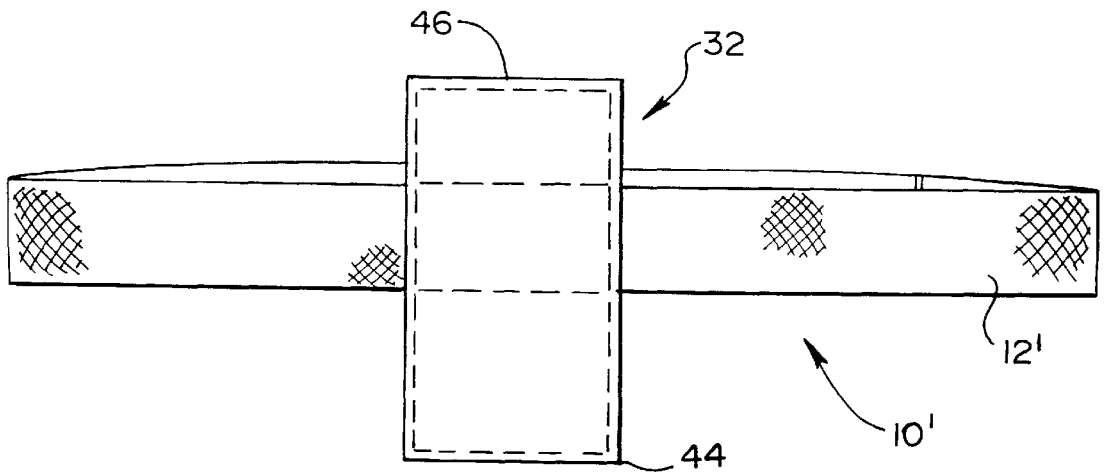
FIG. 5 is a top plan view of an alternate seat belt shoulder strap adjustment device.
Figure 6:
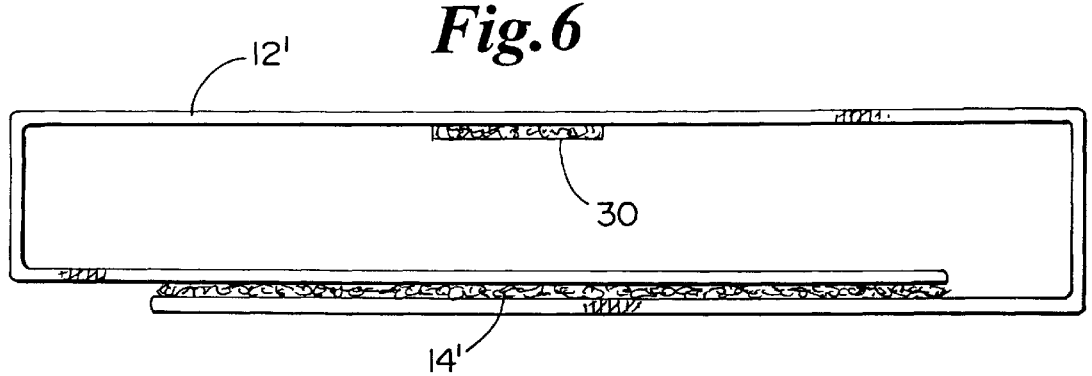
FIG. 6 is a side view of the adjustment strap of the seat belt shoulder strap adjustment device of FIG. 5.
Figure 7:
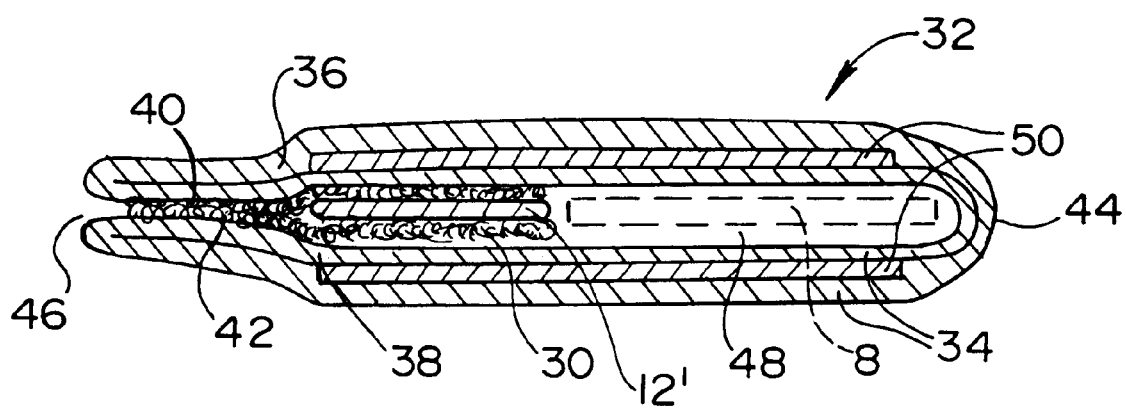
FIG. 7 is a side view of the hinged-clamp of the seat belt shoulder strap adjustment device of FIG. 5.

Referring to FIGS. 5, 6, and 7, in another preferred embodiment, a seat belt shoulder strap adjustment device 10' of the invention has a releasable securement device in the form of a hinged-clamp 32 (shown in FIGS. 5 and 7) in place of the clip 16. Referring to FIG. 7, the hinged-clamp 32 is formed from a folded length of webbing 34, or other suitably strong material, with the opposite ends forming arms 36, 38 folded toward each other in a u-shape and releasably secured together at the open end 46 by cooperating elements 40, 42 of a hook-and-loop type fastener. Within the webbing material 34 of each arm 36, 38 is sewn, adjacent to the hinge 44, a piece of flat, stiff plastic 50, approximately three quarters of the length of each folded arm. These plastic pieces 50 stiffen the hinged-clamp material and hold the seat belt flat without curling, while still permitting flexibility at the open end 46 of the hinged-clamp to aid in release of the clamp fastening elements. The preferred dimensions of the hinged-clamp 32 are about 2 inches wide by 3¾ inches long (folded length).

Attached to the inner, facing surfaces of the arms 36, 38 are cooperating elements 40, 42 of a hook-and-loop type fastener, each about 1½ inches wide by 2 inches long and sewn, or otherwise permanently affixed slightly inset from the open end 46 of the clamp arms. These cooperating elements provide releasable closure of the hinged-clamp 32 to an adjustment strap 12', when the clamp 32 is folded over a seat belt 8 (shown in dashed lines).

Referring to FIGS. 5 and 6, a corresponding adjustment strap 12' (with hook-and-loop type fastener 14') is essentially the same as the adjustment strap 12 shown in FIGS. 2 and 3, however an additional element 30 of loop fastening material on the inner surface of strap 12' secures the adjustment strap 12' to a hinged-clamp 32. The element 30 of loop material, preferably about 1½ inches long (equal to the width of the strap 12') is sewn, or otherwise permanently affixed at approximately the mid-point of the strap 12'.

Referring to FIG. 5, a seat belt shoulder strap adjustment device 10' consists of a hinged-clamp 32 secured to an adjustment strap 12'. The hinged-clamp 32 may be made of a folded woven fiber material. In this preferred embodiment, the strap 12' is longitudinally secured across the width of the hinged-clamp 32, approximately a strap-width's distance from the open end 46 of the clamp. In FIG. 7, the placement of the adjustment strap 12' within the clamp 32 is shown, with the element 30 of loop material attached to the strap 12' secured to the inner half of the clamp hook material 42 nearest the clamp hinge 44. This placement of the strap 12' leaves the outer half hook material 42 exposed for releasable engagement with the clamp loop material 40, thus closing the clamp 32. Securing the clamp 32 in this manner defines a region 48 which encloses the seat belt shoulder strap 8 (shown in dashed lines). The hinged clamp 32 is adjustable along both the shoulder strap 8 and the adjustment strap 12'. The region 48 is generally bounded by the flat plastic stiffening pieces 50.

Referring again to FIG. 1, to secure a seat belt shoulder strap 8 comfortably away from the neck and face region, R, of a seat belt user, a seat belt shoulder strap adjustment device 10 is attached to a user, the adjustment device including a body (i.e. shoulder) attachment device 12 for adjustable positioning about the user's shoulder, and a releasable securement device 16 positioned along the body attachment device for securing the seat belt shoulder strap 8 to the body attachment device 12. The body attachment device is then adjustably positioned about the user's shoulder, the releasable securement device 16 is used to releasably secure the seat belt shoulder strap 8 to the body attachment device 10. Finally, the adjustment device is adjusted to draw the seat belt shoulder strap 8 into a position comfortably away from the face and neck region, R, of the user.

Other embodiments of the invention are within the following claims or otherwise contemplated. For example, other releasable and/or adjustable securement means may be employed. Other suitable fasteners and devices for adjusting the length of the strap are also contemplated.

What is claimed is:

1. A seat belt shoulder strap adjustment device comprising:
    a body attachment device adjustably positionable about a user's shoulder; and
    a releasable securement device positioned along the body attachment device to draw a seat belt shoulder strap comfortably away from the user's neck and face region, when the body attachment device is positioned about the user's shoulder.

2. The adjustment device of claim 1, wherein the body attachment device comprises an adjustment strap that is formed from flexible material.

3. The adjustment device of claim 2, wherein the adjustment strap is formed from woven fiber.

4. The adjustment device of claim 2, wherein the adjustment strap is releasably attachable.

5. The adjustment device of claim 4, wherein the adjustment strap comprises a fastener for releasable attachment and adjustment.

6. The adjustment device of claim 5, wherein the fastener comprises an area of hook-and-loop fastening material secured to the adjustment strap.

7. The adjustment device of claim 5, wherein the adjustment strap further comprises a second fastener for releasable attachment to the releasable securement device.

8. The adjustment device of claim 7, wherein the second fastener comprises an area of hook-and-loop fastening material.

9. The adjustment device of claim 2, wherein the releasable securement device is adjustable along both the seat belt shoulder strap and the adjustment strap.

10. The adjustment device of claim 9, wherein the releasable securement device is a clip.

11. The adjustment device of claim 10, wherein the clip comprises releasable engagement portions for both the adjustment strap and the seat belt shoulder strap.

12. The adjustment device of claim 11, wherein each releasable engagement portion is defined by an arm which resiliently impinges upon the material of the respective strap to resiliently secure the clip relative to the respective strap.

13. The adjustment device of claim 9, wherein the releasable securement device is a hinged-clamp.

14. The adjustment device of claim 13, wherein the hinged-clamp is formed from folded woven fiber material.

15. The adjustment device of claim 13, wherein the hinged-clamp comprises
    a plurality of arm portions,
    a hinge portion coupling the arm portions together, and
    a fastener, the fastener providing securement of the seat belt shoulder strap to the adjustment strap when the arm portions of the hinged-clamp are folded over the shoulder strap and the adjustment strap.

16. The adjustment device of claim 15, wherein the hinged-clamp further comprises plastic stiffening members positioned within said arm portions.

17. The adjustment device of claim 15, wherein the fastener comprises an area of hook-and-loop fastening material.

18. A method of securing a seat belt shoulder strap comfortably away from the neck and face region of a seat belt user, comprising the steps of:
    attaching a seat belt shoulder strap adjustment device to a user, the adjustment device comprising a body attachment device for adjustable positioning about the user's shoulder, and a releasable securement device positioned along the body attachment device for securing the seat belt shoulder strap to the body attachment device;
    adjustably positioning the body attachment device about the user's shoulder;
    using the releasable securement device to releasably secure the seat belt shoulder strap to the body attachment device; and
    adjusting the adjustment device to draw the seat belt shoulder strap into a position comfortably away from the face and neck region of the user.

19. A seat belt shoulder strap adjustment device comprising:
    a means for releasably securing a seat belt shoulder strap comfortably away from a user's neck and face region; and
    a means for attaching the releasably securing means adjustably and positionably about the user's shoulder.

* * * * *